United States Patent [19]

Goodson

[11] Patent Number: 5,112,442
[45] Date of Patent: May 12, 1992

[54] LIQUID VAPORIZING PROCESS FOR MANUFACTURING IRON OXIDE

[75] Inventor: Forrest R. Goodson, San Jose, Calif.

[73] Assignee: United Technologies Corporation, Hartford, Conn.

[21] Appl. No.: 588,911

[22] Filed: Sep. 27, 1990

[51] Int. Cl.$^5$ .............................. B01D 1/22; H05B 3/00
[52] U.S. Cl. ..................................... 159/49; 159/13.3; 159/13.4; 159/16.1; 159/27.4; 159/43.1; 392/387; 392/394; 423/417
[58] Field of Search .................. 159/13.4, 27.4, 16.1, 159/13.3, 49, 43.1, 44; 202/236; 203/89, 72, 49; 423/417; 392/387, 394, 403, 404

[56] References Cited

U.S. PATENT DOCUMENTS

| | | | |
|---|---|---|---|
| 496,757 | 5/1893 | Theisen | 159/13.2 |
| 538,557 | 4/1895 | Theisen | 202/236 |
| 1,219,413 | 3/1917 | Donk | 202/236 |
| 2,004,011 | 6/1935 | Podbielniak | 202/236 |
| 2,327,788 | 8/1943 | Hickman | 392/394 |
| 2,341,258 | 2/1944 | Appel | 159/13.4 |
| 2,353,551 | 7/1944 | Dexter | 202/236 |
| 2,772,956 | 12/1956 | West et al. | 75/0.5 |
| 2,851,347 | 9/1958 | Schlecht et al. | 75/0.5 |
| 2,851,348 | 9/1958 | Oestreicher et al. | 75/0.5 |
| 2,900,245 | 8/1959 | Beller | 75/0.5 |
| 2,938,781 | 5/1960 | Schmeckenbecher | 75/0.5 |
| 3,147,174 | 9/1964 | Cook | 159/13.4 |
| 3,370,635 | 2/1968 | Kumm | 202/236 |
| 3,506,803 | 4/1970 | Hart | 392/387 |
| 3,767,378 | 10/1973 | Cochran et al. | 75/1 |
| 4,017,355 | 4/1977 | Kiyota et al. | 159/13.4 |
| 4,056,386 | 11/1977 | McEwan et al. | 75/0.5 BA |
| 4,250,157 | 2/1981 | Ruskin et al. | 423/417 |
| 4,652,305 | 3/1987 | Ebenhoech et al. | 75/0.5 BA |

OTHER PUBLICATIONS

Theory, Production Technology, and Properties of Powders; "Preparation of Highly Dispersed Ferric Oxide Powd. of Uniform Particle Size by the Carbonyl Method", V. G. Syrkin and N. E. Polushkina, Moscow, No. 4(52), pp. 1-7, Apr. 1967.

Preparation of Highly Dispersed Homogeneous Powder of Iron Oxide by the Carbonyl Method, V. S. Syrkin and N. E. Polushkina, Porosh. Met. 7(4), 1-7 (1967) (Russ.), Chem. Abstr., No. 10, vol. 67, p. 4296, 1967.

*Primary Examiner*—Wilbur Bascomb, Jr.

[57] ABSTRACT

The present invention discloses a method and apparatus for the production of vapors of a liquid iron compound. The apparatus contains a vertical evaporator element which has an internal heating unit and an apparatus for introducing a regulated amount of the liquid iron compound onto the surface of the evaporator element. The evaporator element being enclosed in a gas tight housing into which a purge gas may be introduced to carry the resultant vapors out of the housing to a reactor chamber.

Also disclosed is a method for evaporating a liquid iron compound comprising placing the liquid iron compound onto the surface of the heated evaporator element, thereby causing the iron compound to vaporize and then carrying the vaporized iron compound out of the evaporator with a purge gas.

Further disclosed is a method for forming iron oxide using the evaporator.

5 Claims, 1 Drawing Sheet

LIQUID VAPORIZING PROCESS FOR MANUFACTURING IRON OXIDE

TECHNICAL FIELD

The technical field to which this invention relates is the production of iron oxide through the thermal decomposition and oxidation of an iron containing compound.

BACKGROUND OF THE INVENTION

The production of iron oxide particles has been the object of investigation for many years. These investigations have resulted in a method of forming iron oxide particles by thermally decomposing and oxidizing an iron compound, typically iron pentacarbonyl in the presence of an oxidizing gas, typically a gas containing molecular oxygen i.e., air. To achieve iron oxide particles having certain desirable physical characteristics, i.e., particle size, heat transfer properties etc., additional processing steps or ingredients have been introduced into the basic process from time to time.

One of the important steps in the process has been the production of very fine particles of the iron compound. This is usually accomplished by simply raising a pool of the liquid iron compound to boiling and causing the vapors to be carried away, usually via a purge gas, to the reaction chamber. Another technique is to place a bubbler into a pool of the liquid iron compound and pass the purge gas through the bubbler thereby vaporizing the iron compound and carrying the vaporized compound to the reaction chamber where it is contacted with the oxidizing gas.

However, each of these methods has a decided drawback, particularly when high production rates of iron oxide are desired. That drawback is the potential for misting or the production of liquid droplets of the iron compound in addition to the vapors which are then carried to the reactor. Such droplets of the iron compound constitute fuel rich sites at which oxidation in the reaction chamber may be incomplete creating undesirably large iron particles which may reduce the efficiency of the apparatus or interfere with production. This problem may be overcome by lowering the flow rate of the purging gas or reducing the vigorousness of the boiling activity. However, such steps limit the ability to produce the desired iron oxide in high production processing.

Therefore, what is needed in this art is a method to safely, and uniformly produce vapors of iron containing liquid compounds which overcome the aforementioned limitations.

BRIEF DESCRIPTION OF THE INVENTION

The present invention discloses a method and apparatus for the production of vapors of a liquid iron compound. The apparatus comprises a vertical evaporator element which has an internal heating means and a means for introducing a regulated amount of a liquid iron compound onto the surface of the evaporator element. The evaporator element being enclosed in a gas tight housing having a means for introducing a purge gas into said housing to carry the resultant vapors out of the housing to a reactor chamber.

Also disclosed is a method for evaporating a liquid iron compound comprising placing the liquid iron compound onto the surface of the heated evaporator element, thereby causing the iron compound to vaporize and then carrying the vaporized iron compound out of the evaporator with a purge gas.

Further disclosed is a method for forming iron oxide using the evaporator.

BEST MODE FOR CARRYING OUT THE INVENTION

Figure 1:
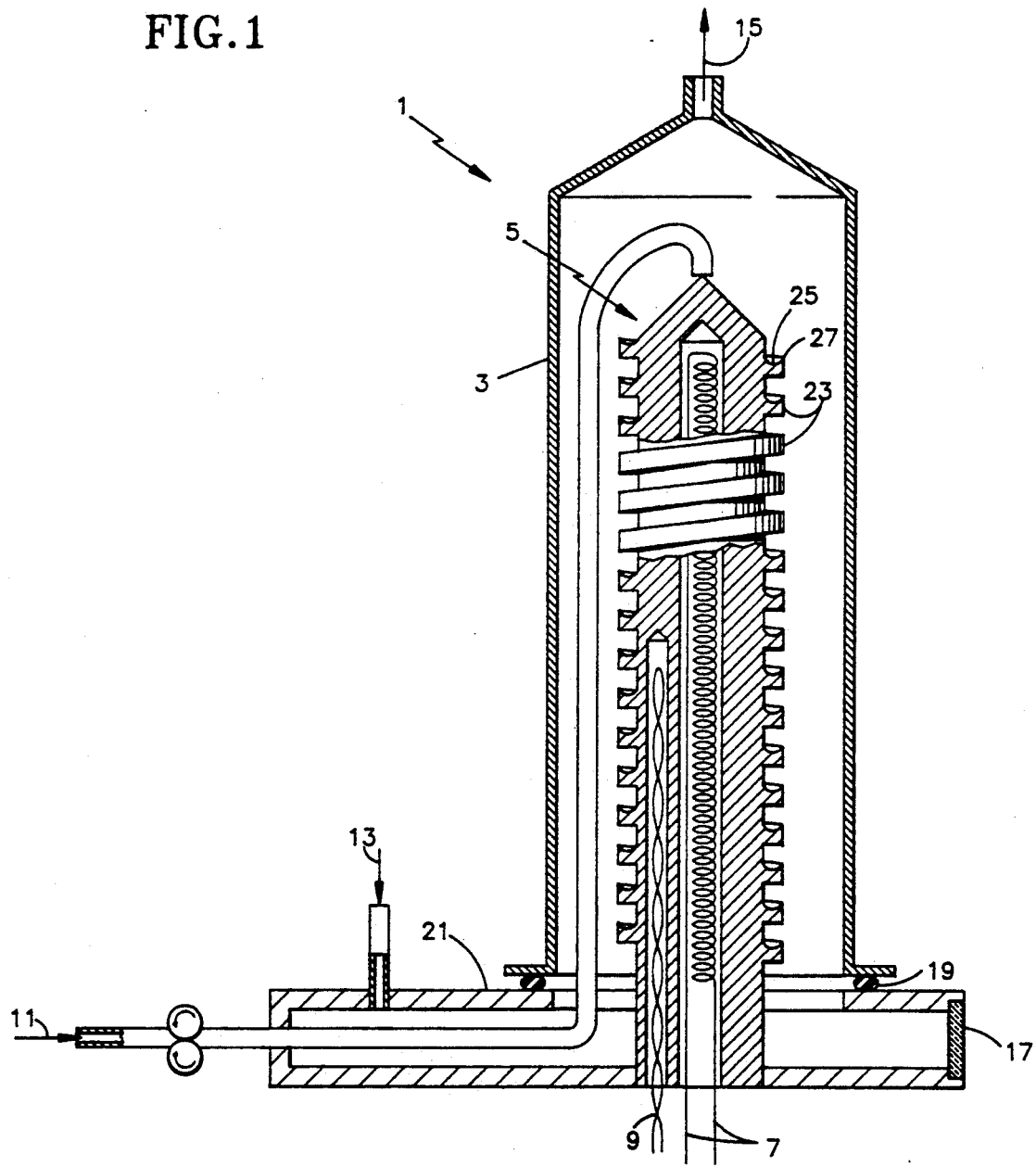
FIG. 1 is a cross section of one embodiment of the evaporator of the present invention.

Referring to FIG. 1 which depicts a cross section of the current evaporator and which is exemplary and not meant to be limiting. The evaporator 1 comprises a gas tight housing 3 which surrounds the evaporator element 5. The element being positioned vertically inside the housing having a heating element 7 and a thermocouple 9 to regulate the temperature during operation. In addition, there is also a means for introducing a regulated amount of the iron compound to be evaporated 11 to the evaporator element and a means to introduce a purge gas 13 into the housing to carry the vaporized iron compound out of the evaporator through an opening 15 which leads to the reactor where the iron compound is converted to iron oxide powder. In addition a sight glass 17 is depicted to permit an operator to view the base of the evaporator element to determine if excess iron compound is present in the system. Further, o-ring 19 is depicted as a sealing means between the housing 3 and the base 21 to form a gas tight seal.

The gas tight housing may be of any shape or dimensions such that it is capable of enclosing the evaporator element and is capable of withstanding the temperatures in excess of those required to cause the iron compounds to vaporize. Further, the housing should be capable of producing a gas tight environment about the evaporator element. In addition the materials used to produce the housing should be non-reactive vis a vis the materials introduced into the housing during the evaporative process. The preferred materials are stainless steel, brass, and aluminum.

The evaporator element 5 is a vertical element, typically elongate in shape, however, other shapes may be used, which is formed of non-reactive materials vis a vis the materials to be introduced into the housing during the evaporation process and also should be capable of withstanding the temperatures required to vaporize the iron compounds. Although the evaporator element is described as being elongate and vertical, it should be understood that other shapes may be used with the limitation that whatever shape is selected permits the iron liquid to spread or disperse over a portion of the evaporator surface thereby forming a thin layer of liquid which may be easily and quickly evaporated. The surface of the element may be smooth, however, it is preferred that the surface have some means to increase the surface area of the element, or increase the pathway length down which the liquid will travel from top to bottom of the element. This may be achieved by roughening the surface through the introduction of randomly or regularly positioned protrusions jutting out over the surface. These protrusions create an increased surface area on the element thereby permitting increased evaporation of the iron compound. The most preferred configuration is where the surface of the element has a continuous downward spiral groove or pathway running around the periphery of the element which permits the liquid, having been placed on the top of the element, to slowly flow down the element thereby producing a thin liquid film and longer residency time on the surface of the element for this liquid iron compound. This longer residency time permits greater amounts of iron compounds to be introduced onto the surface of the element without having the liquid accumulate at the base of the element where it could be a potential safety hazard. It is also desirable to have the outboard flank of the continuous spiral thread (or grooves) 23 configured in a concave form so that the middle of the thread flank 25 is lower than the crest 27 of the thread flank thereby acting like a trough to prevent the liquid from flowing over the crest of the thread 27. These protrusions, spirals or other surface areas increasing configurations may be machined into the surface of the evaporator or may be attached through any means i.e., welding, bonding, etc.

It should be noted that although the specification identifies iron carbonyls and, in particular, iron pentacarbonyl as the natural choice in this invention, other carbonyls such as di-iron nonacarbonyl or tri-iron ennea carbonyl or other iron carbonyls may also be used. Also, other iron compounds may be used such as ferrocene and iron halides (chloride, iodine, etc.)

The heating means for elevating the temperature of the surface of the evaporator element to a temperature sufficient to vaporize the iron compound may be of any conventional variety and of any configuration. The configuration depicted shows the heater element introduced into the central core of the evaporator element. The heater in this preferred configuration is a resistive wire electric heater which permits control of the surface temperature of the evaporator element through the control of the amount of electricity supplied to the heater. The control mechanism is not shown as it may be a conventional control such as a variable rheostat. The temperature of the evaporator element is determined by any conventional temperature sensing device such as a thermocouple. The preferred device is depicted as a thermocouple positioned inside the core of the evaporator element near the surface. However, it is possible to have other temperature measuring devices such as contact thermocouples positioned on the surface of the evaporator element.

A means for introducing the liquid to be evaporated must also be present. Such a system is depicted as a pump. Typically, this will require a tube of some sort through which a regulated amount of liquid can be fed and which is so positioned that the liquid exiting the tube will be placed onto the surface of the evaporator element. The liquid may be in the form of a mist, spray, droplets or a stream. It is preferred that the liquid be placed onto the evaporator element at the top and allowed to flow down the sides of the evaporator element. Naturally, in those configurations having the spiral thread on the surface of the evaporator element, the liquid would be placed in the thread and allowed to flow down the thread toward the base. The amount of liquid supplied to the evaporator element would be easily controlled by known flow control means not shown.

An inert purge gas means is present to introduce a purge gas into the housing to mix with, dilute and carry away the vaporized iron compound. The inlet for the purge gas may be positioned anywhere in the housing, however, it is preferred that it be at or near the base of the evaporator element and flow up and across the surface of the evaporator element and out the exit to the reactor. The purge gas is generally an inert gas such as nitrogen, argon or helium with nitrogen preferred. The amount of purge gas supplied again may be controlled by any conventional flow control means and the amount of flow will depend on the physical properties desired of the final product and the rate of vaporization of the iron compound.

In addition, it may be desirable to have a means for determining that the rate of vaporization of the iron compound is compatible with the supply of the liquid iron compound such that the liquid iron compound supplied to the evaporator element is completely evaporated before it reaches the base of the evaporator element. This may be achieved by a simple sight glass or other optical device to view the base of the evaporator element or sensor of some other sort i.e., electrical or mechanical.

During the operation of the evaporator, the heating element is activated and the surface of the evaporator element is raised to the desired temperature. Typically, this will be at or slightly above the boiling point of the liquid iron compound and for iron carbonyls will range between 216° F. and 500° F. Specifically for iron pentacarbonyl the temperature should be between 75° F. and 350° F. with the preferred being about 216° F. to about 350° F. After the surface of the evaporator has reached the proper temperature, the liquid iron compound is placed on the evaporator element at a prescribed rate. Although the rate of deposition will vary depending on the particular material being used and the design and efficiency of the evaporator rates of about 1 Kg/Hr to about 4 Kg/Hr are typical.

As the liquid iron compound is vaporizing, a constant flow of purge gas is introduced into the housing to carry the vaporized iron compound out of the housing and into the reactor where the iron compound is oxidized at an elevated temperature in the presence of an oxidizing gas to form iron oxide. This reaction is well known in the art and the process and apparatus are conventional. These reactors generally comprise a large reaction chamber which is heated to the oxidation temperature of a given iron compound. In the case of iron carbonyls the temperature would range between 300° F. to 2000° F. and for iron pentacarbonyl it would be about 500° F. to about 700° F. As the iron carbonyl and purge gas mixture enter the heated reactor chamber it is mixed with an oxidizing gas such as air or molecular oxygen which then spontaneously reacts with the iron compound to form iron oxide particles. The resulting particles may then be removed by electrostatic precipitation or other means. It may further be possible to mix the evaporated iron compound with an oxidizing gas at temperatures below that which substantial oxidation of the iron compound to iron oxide takes place prior to its introduction into the reactor chamber. This will permit the dilution of the molecules of iron compound resulting in smaller iron oxide particle production.

EXAMPLE

An evaporator of the present invention was assembled using a base comprising stainless steel through which was passed an aluminum spike 1.25 inches in diameter and 12.5 inches in length. The spike was protruding 10 inches above the base into the housing. A spiral thread 0.25 inches deep with a pitch of two threads per inch was machined into the surface of the spike. The thread, or more specifically one of the flanks, of the thread was slightly concave and therefore the bottom of the flank was below the crest of the thread to ensure that the flow of liquid iron compound did not spill over the thread crest. The spike was fitted internally with a coaxially mounted 400 watt electric cartridge heater. In addition a thermocouple was also embedded into the spike to measure the bulk temperature of the spike. The thermocouple was also attached to an electronic temperature controller that modulated the power input to the heater to control the temperature of the spike to a temperature of 250° F. The spike was positioned in a stainless steel base and a housing of stainless steel 3.65 inches in diameter and 11.25 inches in height was clamped over the evaporator element onto the steel base using o-rings to create a gas tight fit. A sight glass was positioned at the base of the housing as depicted in the Figure.

A flow of nitrogen purge gas was introduced to the housing and the evaporator element was heated to 250° F. The iron pentacarbonyl was placed onto the evaporator element at the rate of 2 Kg/Hr. The resulting purge gas/iron pentacarbonyl vapors were then directed out of the housing through an insulated injector and mixed with a coaxial air stream which had been heated to 600° F. and flowing at a rate of 176 cubic feet per minute. The mixture then passed into a coiled, thinwall, corrugated aluminum duct 4 inches in diameter and 30 feet long. The resulting iron oxide particles were then removed by an electrostatic precipitator.

The results were 683 grams of superfine iron oxide powder from a total of 2511 grams of iron pentacarbonyl or a 67% conversion and recovery which upon drying produced 560 grams of iron oxide having a surface area of 285 m/gm.

The resulting method and apparatus achieve a safe and controlled evaporation of iron compounds permitting the production of controlled iron oxide particles having high uniformity of physical properties. In addition, the present method permits high production rates without the attendant heavy film or large particle deposits which may interfere with the injectors or require acid washing for removal after the oxidation run.

I claim:

1. A method for vaporizing a liquid comprising:
   a. introducing a liquid to be vaporized onto the top surface of a vertical evaporator positioned inside a gas tight housing at such a rate that the liquid is completely evaporated before it reaches the base of the evaporator;
   b. causing said liquid to flow down the surface of the evaporator;
   c. heating said evaporator surface to a temperature sufficient to cause the liquid to evaporate forming vapors;
   d. simultaneously introducing a purge gas to said housing to remove said vapors;
   e. monitoring the evaporation rate of the liquid to ensure complete evaporation of the liquid before said liquid reaches the base of the evaporator.

2. The method of claim 1 wherein the liquid is iron carbonyl.

3. The method of claim 1 wherein the surface of the evaporator contains a descending, spiral thread.

4. The method of claim 3 wherein the liquid travels down the spiral thread in the surface of the evaporator.

5. The method of claim 3 wherein the purge gas is nitrogen.

* * * * *